United States Patent [19]

Coleman

[11] 4,050,671

[45] Sept. 27, 1977

[54] DOOR HANGER DEVICE

[75] Inventor: Ronald J. Coleman, Marrero, La.

[73] Assignees: Victor S. Mott, Gretna; Gilbert Groetsch, Metairie; John R. Johnston, Gretna; Ewald Groetsch, Metairie, all of La. ; part interest to each

[21] Appl. No.: 687,544

[22] Filed: May 18, 1976

[51] Int. Cl.² .............................................. B66F 3/08
[52] U.S. Cl. ..................................... 254/7 R; 269/17
[58] Field of Search .............. 254/7 R, 7 B, 7 C, 133, 254/134; 269/60, 71, 321 F, 321 S, 43–45, 17; 214/1 S, 1 SW, 1 D

[56] References Cited

U.S. PATENT DOCUMENTS

| 2,503,388 | 4/1950 | Hedlund | 214/1 D |
| 2,663,929 | 12/1953 | Carpenter | 269/60 |
| 2,737,709 | 3/1956 | Lovelace | 269/71 |
| 2,774,134 | 12/1956 | Smith et al. | 269/45 |
| 2,967,627 | 1/1961 | Vison | 214/1 D |
| 3,382,988 | 5/1968 | O'Reilly | 214/1 SW |

Primary Examiner—Robert C. Watson
Attorney, Agent, or Firm—Clarence A. O'Brien; Harvey B. Jacobson

[57] ABSTRACT

A door hanger device having a horizontal support structure having rollers mounted on the bottom thereof and clamping vise-like structure on the upper surface for clamping and holding at least two doors simultaneously. A vertical support structure is securely fastened to one end of the horizontal support structure and diagonal bracing between the horizontal support structure and the vertical support structure is provided for greatly increasing the overall strength of the device. Door clamping structure similar to the structure mounted on the horizontal support is also provided for the vertical support structure and the vertical clamp devices are adjustable vertically along the vertical support structure. A screw thread being operated with a proper ratio gearing is provided for changing the vertical adjustment of said clamping devices. The horizontal support structure forms a generally U shape so that three doors may be transported and held simultaneously without interfering one with the other. The invention also envisions extension structure for both the horizontal and vertical supports. These extensions will greatly increase the capacity and versatility of the overall device. The extensions also have door clamping vise-like structures mounted thereon and the vertical extension has another screw-threaded adjustable means for varying the vertical position of the associated clamps.

2 Claims, 7 Drawing Figures

U.S. Patent  Sept. 27, 1977  Sheet 1 of 2  4,050,671
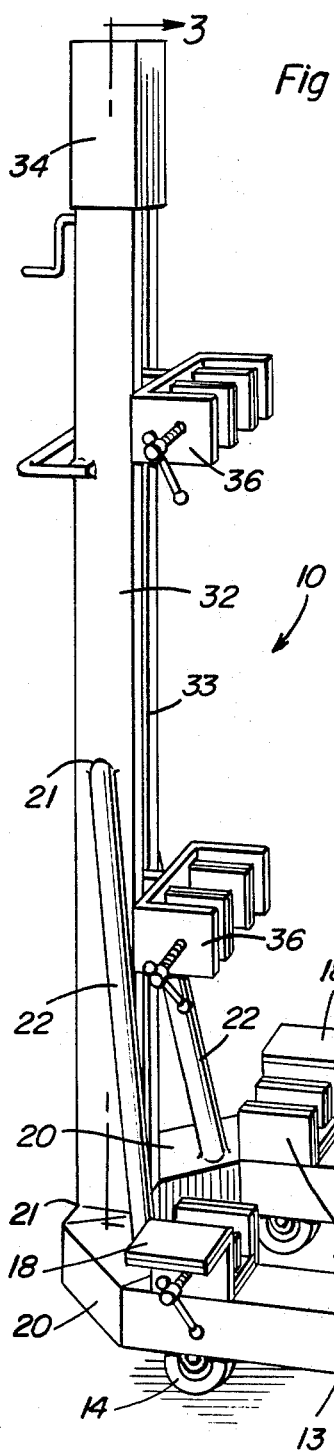
Fig. 1
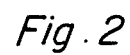
Fig. 2
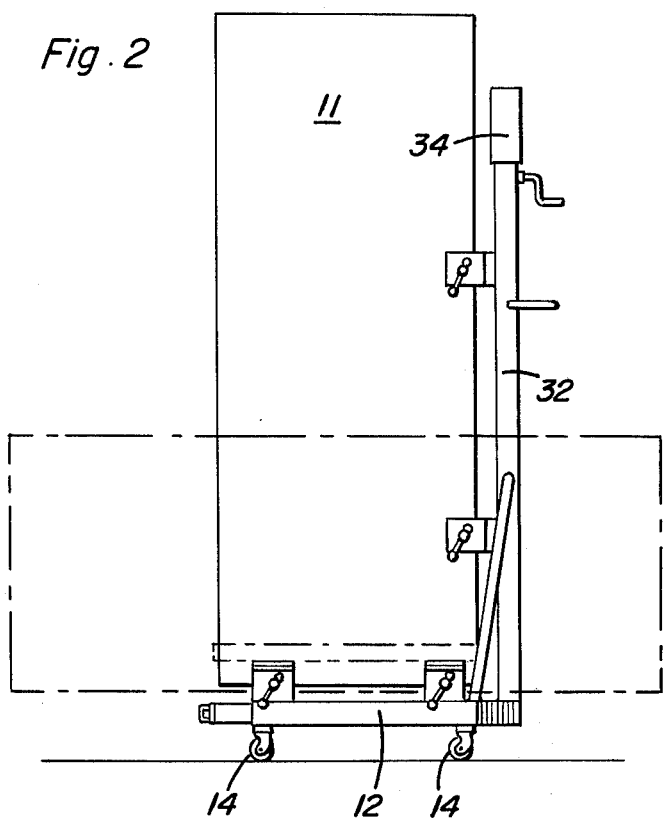
Fig. 5
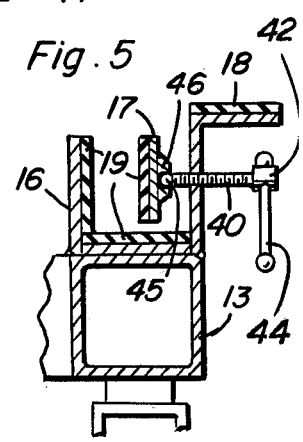
Fig. 6
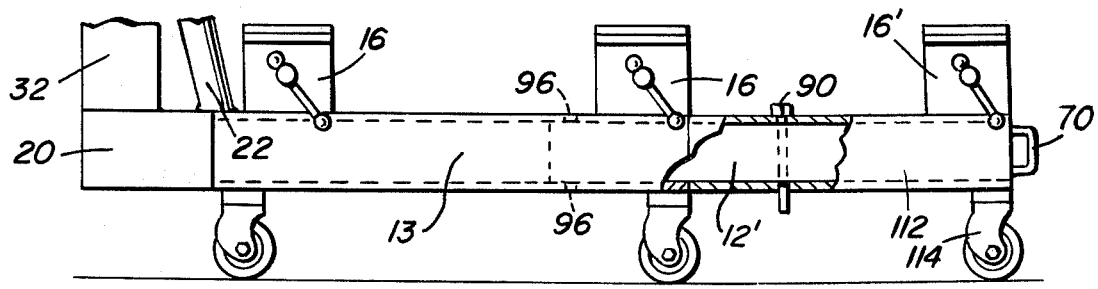

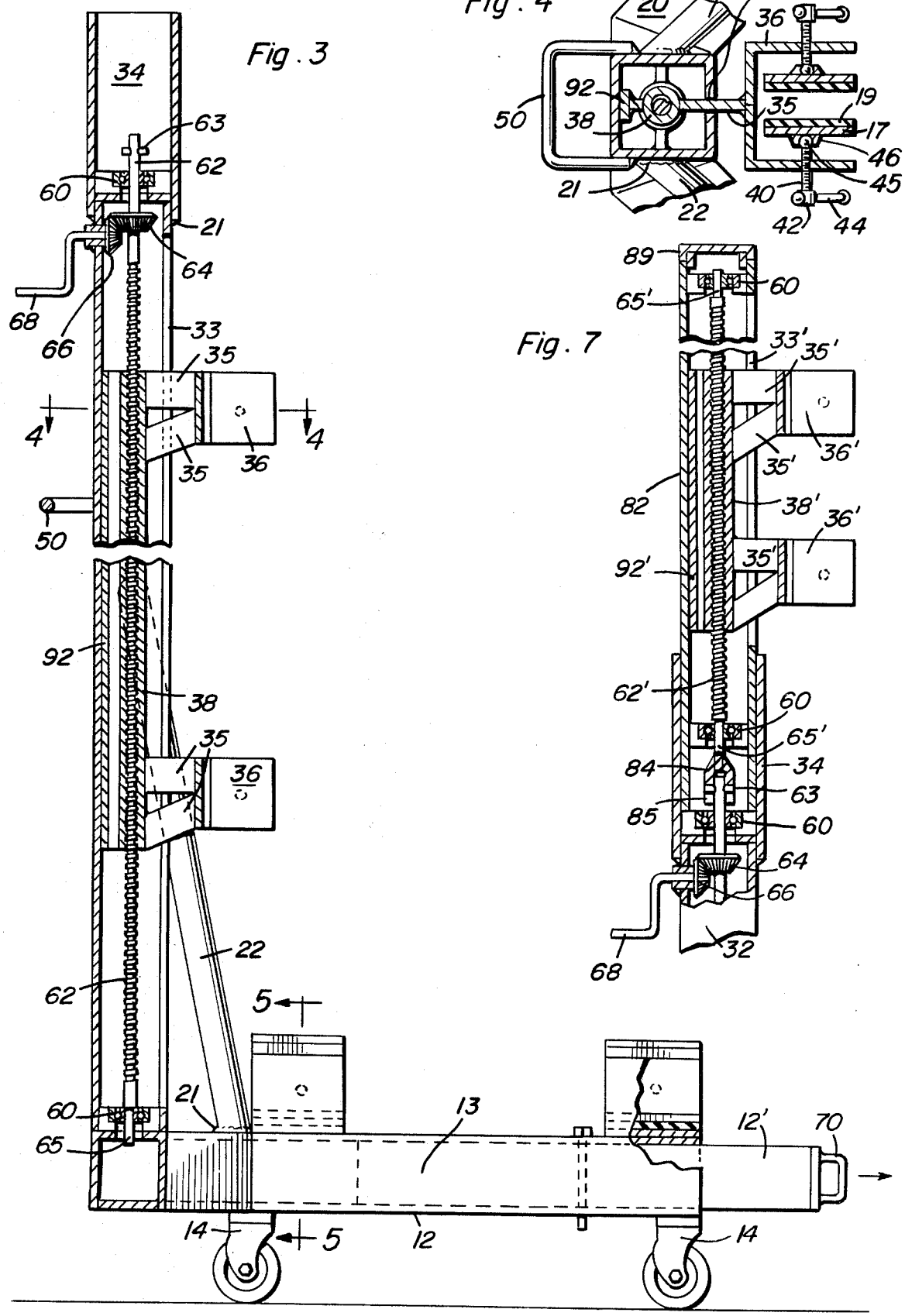

DOOR HANGER DEVICE

BACKGROUND OF THE INVENTION

1. Field of the Invention

This invention relates generally to devices for transporting and hanging doors and the like. The device will hole at least three doors at one time without interference with one another and in a positively firm manner, also adjustment of the doors being held by said device is readily accomplished.

2. Description of the Prior Art

Devices for holding, clamping, and transporting various type objects are very known. For example such known type devices include transmission transporting and lifting devices, water closet holding and transporting devices, motor vehicle jacks and lifts, radiator benches and supports, and numerous other types of lifts and jacks. However, none of these devices are specifically designed for transporting and holding doors and the like.

A number of known devices are designed for their specific type application and as such are not readily adaptable or usable in the manner of the invention disclosed herein. A problem with known prior art devices is that they are not adjustable longitudinally in a horizontal direction and longitudinally in a vertical direction so as to be usable with doors of various configurations. Also known devices do not offer the versatility and flexibility that the device of this invention discloses.

Known prior art U.S. Pat. Nos. which may be pertinent to this invention are as follows:

2,663,929 L.M. Carpenter Dec. 29,1953
3,215,402 I.V.K. Hott et al Nov. 2, 1965
3,309,060 J. Villars Mar. 14, 1967
3,391,905 R.S. Burns July 9,1968

None of these known prior art devices offers the new and unique features of the invention disclosed herein.

SUMMARY OF THE INVENTION

An object of the present invention is to provide a door hanger device which is readily movable from one location to another and can support and positively hold no less than three doors simultaneously.

Another object of the present invention is to provide a door hanger device which will allow a door to be positively held in an upright, normally as installed position, for case in hanging said door to the doorframe.

A further object of this invention is to provide a door hanger and support device which is readily movable from one location to another and yet is of extra strong and rigid construction so that the weight of a number of doors being carried simultaneously will have no undesirable effect upon the structure itself.

A still further object of this invention is to provide a supporting structure for clamping doors and the like which will permit the doors to be worked on in a level horizontal position if desired by the workman.

Another further object of this invention is to provide a door hanging device having easy adjustable structure for varying the vertical position of the door by a single operator of the device for the purpose of hanging same.

A still further object of this invention is to provide a door hanging and support structure which has support extensions provided for both the horizontal and vertical portions of the basic device. This is for the purpose of greatly increasing the adaptability and flexibility and the range of door sizes and configurations which may be adequately handled by the device all by a single operator.

The door hanger and support device of this invention has a number of very important features. First it acts as a movable dolly which will support up to three doors simultaneously. Two of the doors will be held and positively retained by clamp structure associated with the overall device in a horizontal position. A third door will be supported and held in a normally as used vertical position. Four heavy-duty and heavy-load capacity wheel means are provided so that easy movement of the overall structure can be accomplished while the device is fully loaded.

While the two horizontal doors are in the horizontal travel position, they can also be easily worked upon. For example, routing and planing can be done in this position. The horizontal clamp members provided with the structure can also be used as a table because of the additional flanged extensions integral therewith in the event that sanding or the replacement of Formica and the like would need to be done. Another feature is that the door being transported and held in the vertical position can be readily raised or lowered for actual hanging of the door to a doorframe. The clamping structures for the door are adjustable by means of accurate low gear ratio driven thread means to raise and lower the door of almost any weight very, very easily by a single operator. This gearing will also be of help in lowering or raising the door for positioning of the butts on the frame. In addition to holding the door at the proper height, it also holds the door steady for easy and accurate attachment to the frame.

Another feature is that all of the clamping devices provided on both the horizontal support structure and the vertical support structure have soft door engaging cover means made of rubber or the like to prevent any damage, marring, or scarring of the doors with which the device is being used.

Another feature is the use of additional extension devices for both the horizontal and vertical support structures. These additional extension structures will greatly increase the adaptability, flexibility, and range of uses for the overall structure. With these extensions doors much larger than standard six feet - eigth inch doors can be hung and/or transported.

One man can easily perform all of the above functions, all of which are necessary in the hanging of doors.

It is also envisioned that in addition to the hand operated screw mechanism disclosed, a motor of electric, hydraulic, or pneumatic type may be used for driving the pinion instead of being operated manually.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the overall door hanger device of this invention.

FIG. 2 is a right side elevational view of the device as in use supporting doors.

FIG. 3 is a left side elevational view, partly in cross section, taken generally along line 3-3 of FIG. 1.

FIG. 4 is a top plan view, in cross section, taken generally along line 4-4 of FIG. 3.

FIG. 5 is a cross-sectional view, taken generally along line 5-5 of FIG. 3.

FIG. 6 is a view of the lower horizontal support structure, looking from the left, and partly broken away, showing the extension structure for use with this device.

FIG. 7 is a left side elevational view, partly broken away, of an extension for the upright support structure of this invention.

DESCRPTION OF THE PREFERRED EMBODIMENT

Referring to FIG. 1 of the drawings, reference numeral 10 indicates in general the overall device of this invention comprising a wheeled dolly. FIG. 2 shows the dolly in small scale and as in proposed use. A door 11 is supported in vertical position by a the vertical support structure and a door indicated in dotted lines mounted is supported in the horizontal position 2 horizontal support structure. The horizontal support structure consists of a basic horizontal frame 12 having heavy load carrying rollers 14 mounted on the bottom thereof. The frame 12 include two horizontal support member 13 connected at one pairs of correspondinc rear ends side-by-side extending therebetween and secured thereto and to each other by welding. The vertical support structure comprises a vertical support member 32 whose lower end is secured to the adjacent ends of members 20 by welding. Diagonal tubular braces 22 are normally provided to securely brace the vertical member 12 with respect to the frame 12. Suitable welding 21 is appropriately used at all points as necessary and as is well known in the art.

It has found that the members 13, 20 and 32 may be made from structural tubing which has been hot rolled and a dimension of 5 × 5 × ¼ is completely satisfactory for this device. Horizontal support pieces for the extensions to be described below are also made of hot rolled structural tubing, preferably of square configuration, and in order to properly complement the 5 × 5 tubing already described. The extensions 12 for members 13 may be made of 4 × 4 × ¼ tubing of approximately 4 feet in length. These extensions are held by means of the pins 90 indicated in the figures which normally, to fit the size of tubing already described, would be 6 inches in length by one-half inch in diameter.

The horizontal support members legs 13 each has at least two upwardly opening fisual-to-rear aligned clamping members 16 provided thereon. Each of these clamping devices has a horizontal extending flange member 18 which, as one can readily see when looking at FIG. 1, the four flanges 18 will provide a horizontal support structure for a door to be laid flat thereacross. The clamping structures 16 are similar to a vise-like clamp and may be best seen in FIG. 5, wherein a series of rubber covered pad structures 19 are provided within the inside of said clamp and an adjustable portion 17 is mounted on a screw 40 having an enlarged handle-engaging portion 42 for supporting the handle 44 in a conventional vise-type adjusting handle configuration. The adjustable portion 17 has a raised portion 46 thereon having an appropriate aperture therein for receiving the ball-like head 45 of the screw member 40. The other side of the adjustable member 17 also has a door-engaging pad structure 19 provided thereon. The purpose of the door-engaging pad structures 19 is to prevent marring or scarring of the doors while being clamped by the vise-like structures. Any resilient yet firm type material such as rubber, flexible plastic, and the like may be used. As can be readily visualized by looking at the drawings, the horizontal support legs 13 with two vise-like clamps 16 mounted thereon, will hold a door in the horizontal position as best seen in the dotted lines in FIG. 2. The doors thus may be transported from one job site to another without fear or risk of damage to same. They are also being held in a position in which the longitudinal edge of the door may be readily planed or sanded or otherwise worked upon as desired.

The vertical support member 32 is slit longitudinally along its front side facing the horizontal structure to provide an opening slot 33. Mounted within the slot 33 are the support brackets 35, best seen in FIG. 3 which mount and support forwardly opening vertically aligned adjustable vise-like clamps 36. These adjustable clamps, may best be seen in FIG. 4 and have similar adjusting vise-like members 17, 19, and 40 through 46, as already described for FIG. 5. An important difference between the vertical vise-like clamps and the horizontal ones are in the adjustability feature thereof. The support brackets 35 are welded to a tube 38 which is internally threaded for association with the adjusting rod 62. The adjusting rod 62 is normally of approximately one inch in diameter and having Acme threads formed therein. A pipe or tube 38 has similar complementary threads internally thereof for engagement with the threads of rotatabe member 62. The ends of the rod 62 may be of similar size to that of the main rod or reduced as shown at 65 in the lower left portion of FIG. 3. Regardless of the size of the threaded rod 62 the respective end thereof are appropriately supported by ball bearings or the like 60. The lower ball bearing 60 in FIG. 3 functions as a thrust bearing and is appropriately supported by the structure mounted within the base of the vertical upright 32.

At the upper end of the threaded rod 62 is a set of ring and pinion gears 64 and 66. These are designed to provide approximately a 3 1/2:1 ratio for ease in operation of the screw by a single operator. The pinion 66 is approximately connected to a bent rod 68 formed in the shape of a handle. Mounted at the top of the vertical support 32 is a vertical extension coupling 34 and the end of the screw thread 62 has a pin 63 therefor the appropriate coupling with the vertical extension unit to be described below. A handle member 50 best seen in FIGS. 3 and 4 is also provided at approximate mid-height of the average workman for ease in manipulating the overall device.

The vertical and horizontal extensions will now be described. FIG. 6 shows the horizontal extension as connected to the basic horizontal support structure. As mentioned above, an extension member 12' is mounted within each of the base support leg 13 and appropriately provided with a hangle welded thereto 70. By removing the pins 90 the extension members 12' may be extended outwardly to engage the extension member supports 112 shown in FIG. 6. These extension members supports 112 include lower casters 114 appropriately mounted thereto. Appropriate apertures are provided in the extension member supports 112 to receive the pins or bolts 90 and line up with matching holes within the extension units 12'. Appropriate upwardly opening vise-like clamps 16' are also mounted on the outer ends of these horizontal extension members and are in front to-gear alignment with the corresponding clamps 16 on the legs 13.

FIG. 7 shows the vertical extension unit in cross section. This vertical extension unit has a main body member 82 of complementary size and shape to the vertical support member 32 and mounted therewithin by appropriate upper and lower bearing 60 is another threaded rod 62' having a reduced portion 65' at the upper end thereof and an enlarged portion 84 at the lower end thereof including a downwardly opening slot 85 provided therein for engagement with the pin 63 on the top of the primary threaded rod 62. This will form a readily engageable and readily separable drive connection so that when the main threaded rod 62 is operated through the gearing by an operator turning the handle 68, the upper threaded rod 62' of the extension unit will also be turned. Mounted upon the upper thread rod 62' are similar visa-like clamp support brackets 35' firmly and integrally attached to the threaded pipe 38' on the threaded rod 62'. The brackets 35 and 35' include T-head portions 92 and 92' is provided for sliding along the inner side of the vertical tube 32 or 82 and to prevent twisting and displacement of the support brackets 35 and 35' together with the alignment slots 33 and 33'. As can be readily visualized by adding both the horizontal and vertical extension units to the basic structure the capacity of the entire structure will be greatly expanded and increased. With the greatly enlarged capacity extremely large doors such as those used on garages of houses, on hanger doors for airplane hangers, and other usually large doors may be easily and safely handled by a single operator.

The overall device is extremely easy to operate and maintain by one person and offers flexibility and convenience not achievable before this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A dolly for transporting a plurality of doors and supporting a door while the latter is being hung, said dolly including horizontal and vertical support structures, said horizontal structure including a pair of side-by-side legs having front and rear ends interconnected by a transverse connecting structure extending and rigidly connected between the rear ends of said legs, the lower end of said vertical structure being anchored and braced relative to said connecting structure, said horizontal structure including depending support wheel assemblies supported from the front and rear ends of said legs, said vertical support structure including a pair of vertically spaced apart and aligned forwardly opening clamp structures supported therefrom for adjustable shifting therealong with said clamp structures spaced forwardly of said vertical support structure, said legs being free of transverse connections extending therebetween forwardly of a vertical transverse plane containing said clamp structures, said legs each being provided with longitudinally spaced and aligned upwardly opening front and rear clamp structures for support of a door therefrom in spaced relation relative to a door supported and projecting forwardly from said vertically spaced apart clamp structures in a vertical plane spaced between said legs, adjustment means operative to adjustably position said vertically spaced clamp structures along said vertical support structure, an upstanding extension removably supported from the upper end of said vertical support structure, horizontally forwardly opening clamp means mounted on said upstanding extension for adjustable shifting therealong, and connecting means connecting said clamp means and said vertically spaced clamp structures for simultaneous and equal shifting relative to said vertical extension and said vertical support member, said adjustment means including first screw shaft journalled from said vertical support structure and threadedly engaged with said vertically spaced clamp structures, second screw shaft means journalled from said upstanding extension and threadedly engaged with said forwardly opening clamp means, said second screw shaft member being vertically aligned with and disposed above said first screw shaft member and removably coupled thereto for rotation therewith.

2. The combination of claim 1 including an elongated longitudinally forwardly extendable and rearwardly retractable extension carried by each of the forward end of said legs telescopically engaged therewith, and a wheeled tubular extension member support removably telescopically engageable with each of said extensions, when the latter are extended, for support of forward ends thereof, each of said extension member supports including an upwardly opening clamp structure in alignment with the corresponding front and rear clamp structures.

* * * * *